United States Patent
Yang et al.

(10) Patent No.: US 12,087,101 B2
(45) Date of Patent: Sep. 10, 2024

(54) SMART CONTROL DEVICE FOR VEHICLE FACTORY AND VEHICLE CONTROL METHOD USING THE SAME

(71) Applicants: HYUNDAI MOTOR COMPANY, Seoul (KR); Kia Corporation, Seoul (KR)

(72) Inventors: Changmo Yang, Hwaseong-si (KR); Jin Seok Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 421 days.

(21) Appl. No.: 17/464,176

(22) Filed: Sep. 1, 2021

(65) Prior Publication Data

US 2022/0335753 A1    Oct. 20, 2022

(30) Foreign Application Priority Data

Apr. 14, 2021   (KR) ........................ 10-2021-0048161

(51) Int. Cl.
*G07C 5/00* (2006.01)
*G07C 5/08* (2006.01)
(Continued)

(52) U.S. Cl.
CPC ........... *G07C 5/008* (2013.01); *G07C 5/0808* (2013.01); *H04L 67/12* (2013.01)

(58) Field of Classification Search
CPC ....... G07C 5/008; G07C 5/0808; H04L 67/12; H04L 67/125; H04L 67/141; H04L 69/18;
(Continued)

(56) References Cited

U.S. PATENT DOCUMENTS

2014/0012458 A1    1/2014 Park
2018/0302422 A1*  10/2018 Kishikawa ............ H04L 9/3271
(Continued)

FOREIGN PATENT DOCUMENTS

| CN | 109843653 B | * | 5/2023 | ............ B60R 16/02 |
| KR | 101294088 B1 | * | 5/2012 | |
| WO | 2007/045884 A1 | | 4/2007 | |

OTHER PUBLICATIONS

Extended European Search Report issued in corresponding European Patent Application No. 21194275.0 dated Mar. 4, 2022.

*Primary Examiner* — Nga X Nguyen
(74) *Attorney, Agent, or Firm* — MORGAN, LEWIS & BOCKIUS LLP (57) ABSTRACT

A smart control device, detachably mountable to a manufactured vehicle in a vehicle factory, may include a first connector configured to be coupled to an internal communication device in the vehicle including at least one communication protocol to be connected with at least one electric control unit (ECU); a second connector configured to be coupled to a gateway (GW) to establish communication between the at least one ECU and the gateway; a high-speed communication module configured to be connected to the first connector and the second connector and establishing external communication with a factory system; and a smart control module connected to the factory system through the high-speed communication module when receiving a mode designating signal which designates one work mode among a virtualization mode, a monitoring mode, and an update mode from the factory system and controlling the at least one ECU to perform the designated work mode.

20 Claims, 8 Drawing Sheets

(51) Int. Cl.
*H04L 29/08* (2006.01)
*H04L 67/12* (2022.01)

(58) Field of Classification Search
CPC ............... H04L 12/40032; H04L 69/26; H04L 2012/40273; G08C 19/00; H04Q 9/00; B60R 16/02; G06Q 50/04
See application file for complete search history.

(56) References Cited

U.S. PATENT DOCUMENTS

| | | | |
|---|---|---|---|
| 2021/0237668 A1* | 8/2021 | Mizutani | ............... B60R 16/023 |
| 2022/0024471 A1* | 1/2022 | Itatsu | ....................... G06F 11/07 |
| 2022/0157089 A1* | 5/2022 | Srinivasan | .............. H04L 12/46 |

* cited by examiner

SMART CONTROL DEVICE FOR VEHICLE FACTORY AND VEHICLE CONTROL METHOD USING THE SAME

CROSS-REFERENCE TO RELATED APPLICATION

This application claims priority to and the benefit of Korean Patent Application No. 10-2021-0048161 filed in the Korean Intellectual Property Office on Apr. 14, 2021, the entire contents of which are incorporated herein by reference.

TECHNICAL FIELD

The present disclosure relates to a smart control device for a vehicle factory and a vehicle control method using the same. More particularly, the present disclosure relates to a smart control device and a vehicle control method using the same which is temporarily mounted on a vehicle manufactured in the vehicle factory and supports an external communication.

BACKGROUND

In general, vehicles are mechanical means of movement, and in recent years, differentiated IT technologies such as ride comfort, environmental regulations, convenience, economy and stability are converged to the vehicles to become a system.

For example, mechanical devices in vehicles such as transmission units, braking units, steering units, acceleration units, and the likes are being systemized, and for this purpose, numerous controllers (Electronic Control Units; ECUs) are mounted on the vehicles.

Accordingly, tasks such as monitoring, adjusting, and updating of operation state through inspection of various systems applied to the vehicles for each process are performed in a vehicle factory. To this end, the factory system exchanges information with the vehicles through communication connected to the vehicles through an OBD-II (On-Board Diagnostic version II) connector.

Figure 8:
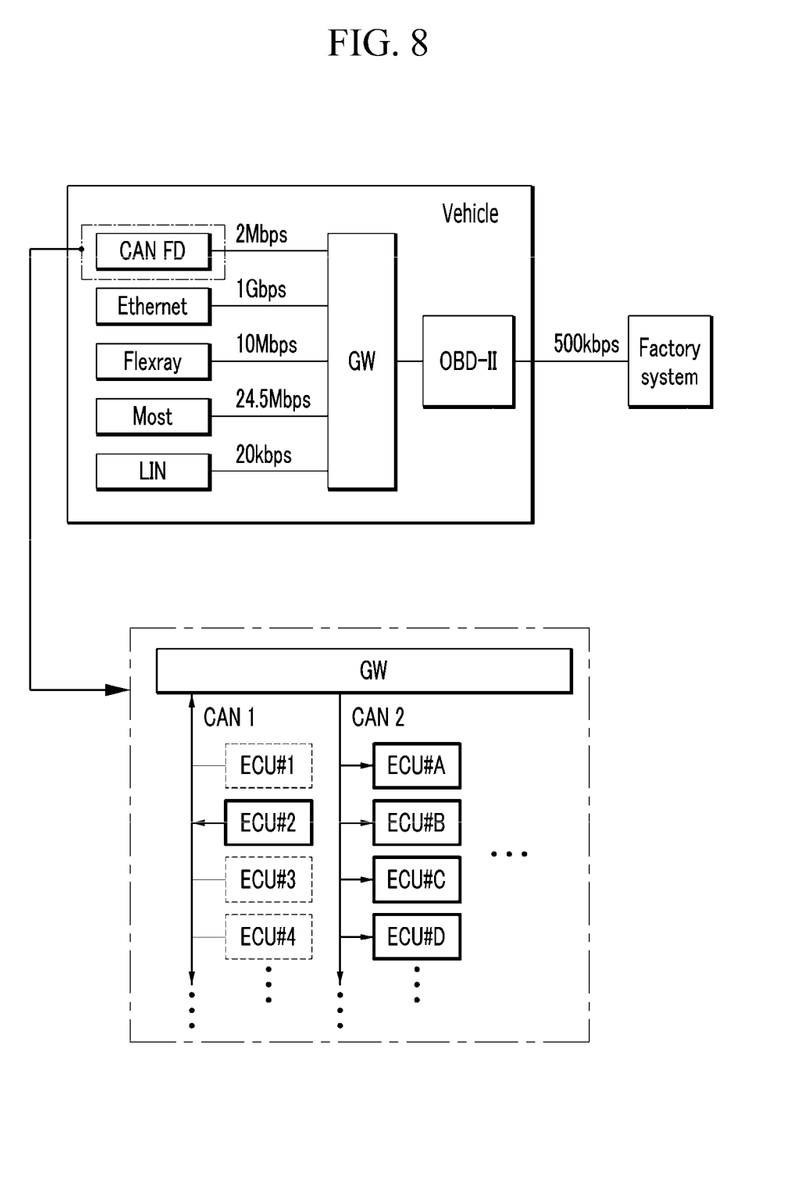
FIG. 8 shows a communication structure between a vehicle and a factory system using an OBD-II according to conventional art.

For example, FIG. 8 shows a communication structure between a vehicle and a factory system using an OBD-II according to conventional art.

Referring to FIG. 8, a gateway (GW) of a vehicle integrates and connects various ECUs for each system (for control function) and communications of different protocol in a general architecture. In addition, the GW connects communication between various ECUs in the vehicle and external factory systems and exchanges information with the various ECUs and the external factory systems.

However, conventional vehicles have various problems due to the communication architecture as follows.

First, a communication protocol used in the OBD-II causes a significant difference in speed compared to a communication protocol of the vehicle, resulting in communication delay and lack of resources. For example, while communication speed of a CANFD is 2 Mbps and communication speed of an Ethernet is 1 Gbps (the CANFD and the Ethernet are the communication protocols of the vehicle), communication speed of a High Speed CAN is 500 kbps (the High Speed CAN is an external communication protocol using the OBD-II).

Second, a technology for inspecting/adjusting the vehicle through a virtualization mode in which the smart factory remotely controls the vehicle by transmitting a simulated signal for executing a specific function to the ECU in the vehicle through a communication is being recently developed. However, a real-time communication cannot be secured and implemented because the corresponding signal must pass through the GW when performing the virtualization mode.

Third, the GW transmits/receives signals of heterogeneous communication protocols (e.g., CAN FD, Ethernet, etc.) of the various ECUs to the outside through the OBD-II connector. However, since a communication bottleneck occurs during the transmission and reception process, the work of processing real-time and large capacity data is virtually impossible.

Due to these problems, works such as inspection, adjusting, and updating cannot be smoothly performed in the vehicle factory when checking the system state applied to the vehicle. Particularly, external instructions for controlling driving of the vehicle cannot be transmitted in real-time during virtualization work in a production factory.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a smart control device for a vehicle factory having advantages of performing a mode control through a smooth communication between various ECUs and an external factory system by being directly connected to communication lines of various protocols while temporarily mounted on a manufactured vehicle, and to provide a vehicle control method using the same.

According to one aspect of the present disclosure, a smart control device, which is detachably mountable to a manufactured vehicle in a vehicle factory, may include a first connector configured to be coupled to an internal communication device in the vehicle including at least one communication protocol to be connected with at least one electric control unit (ECU) of the vehicle; a second connector configured to be coupled to a gateway (GW) to establish communication between the at least one ECU and the gateway; a high-speed communication module configured to be connected to the first connector and the second connector and to establish external communication with a factory system; and a smart control module configured to be connected to the factory system through the high-speed communication module when receiving a mode designating signal which designates one work mode among a virtualization mode, a monitoring mode, and an update mode from the factory system and to control the at least one ECU to perform the designated work mode.

In addition, the second connector may be further configured to establish diagnosis communication with the factory system through the GW and an OBD-II, and the smart control module may be configured to selectively establish the external communication through the high-speed communication module or the diagnosis communication depending on whether the mode designating signal is received.

In addition, the smart control device may further include a signal filter module configured to hook a signal related to the virtualization mode among at least one signal transmitted or received through the internal communication device and to transmit the signal to the smart control module.

In addition, the signal filter module may include a first signal filter module mounted on a side of the first connector and a second signal filter module mounted on a side of the high-speed communication module.

In addition, the first signal filter module may be configured to hook the signal related to the virtualization mode among the at least one signal transmitted or received through the internal communication device and to transmit the signal to the smart control module.

In addition, the second signal filter module may be configured to hook a signal related to the virtualization mode among signals received from the factory system and to transmit the signal to the smart control module.

In addition, the high-speed communication module may be connected to the factory system through a wired interface or wirelessly connected to the factory system through a repeater.

In addition, the smart control module may be configured to directly receive a vehicle driving control signal simulated at the factory system through the high-speed communication module without passing the GW at the virtualization mode.

In addition, the vehicle driving control signal may be generated by simulating a vehicle driving control message used in the vehicle factory and include at least one control signal for controlling at least one of a transmission unit, an acceleration unit, a deceleration unit, a braking unit, and a steering unit of the vehicle.

In addition, the smart control module may be configured to convert the vehicle driving control signal into an ECU control signal related to a vehicle driving control based on types and specifications of the vehicle and transmit the ECU control signal to the at least one ECU.

In addition, the smart control module may be configured to store an ECU control map for each of types and specifications of the vehicle and to convert the vehicle driving control signal into the ECU control signal based on the ECU control map corresponding to the vehicle driving control signal.

In addition, the smart control module may be configured to transmit state information received from the ECU and a sensor involved in the vehicle driving control to the factory system through the high-speed communication module.

In addition, the smart control module may be configured to directly receive a monitoring signal from the ECU and a sensor and to transmit the non-converted monitoring signal to the factory system through the high-speed communication module at the monitoring mode.

In addition, the smart control module may be configured to transmit a non-converted update data of the ECU or a sensor to the corresponding ECU or the corresponding sensor without passing the GW at the update mode.

According to another aspect of the present disclosure, a method of controlling a vehicle by a smart control device interworked with a factory system and detachably mounted to a manufactured vehicle in a vehicle factory may include: step a) of establishing connection between the smart control device and an internal communication device of the vehicle and a gateway (GVV) through a connector to be directly connected to at least one electric control unit (ECU) of the vehicle; step b) of establishing, by the smart control device, external communication with the factory system through a high-speed communication module and waiting for receiving a mode designating signal; step c) of setting, when receiving the mode designating signal which designates one work mode among a virtualization mode, a monitoring mode, and an update mode from the factory system through the high-speed communication module, information required for the corresponding work mode by the smart control device; and step d) of receiving, by the smart control device, a mode control signal through the high-speed communication module and controlling the at least one ECU to perform the designated work mode.

In addition, the step d) may include: receiving a vehicle driving control signal simulated at the factory system at the virtualization mode; identifying types and specifications of the vehicle by analyzing the simulated vehicle driving control signal; and converting the vehicle driving control signal into an ECU control signal related to a vehicle driving control based on an ECU control map corresponding to the types and the specifications of the vehicle and transmitting the ECU control signal to the at least one ECU.

In addition, the method may further include, after transmitting the ECU control signal to the at least one ECU, collecting state information according to a result of the vehicle driving control from the at least one ECU or a sensor and transmitting the state information to the factory system through the high-speed communication module.

In addition, the step d) may include transmitting a non-converted monitoring signal detected by the at least one ECU or a sensor to the factory system without passing the GW at the monitoring mode.

In addition, the step d) may include transmitting a non-converted update data receiving from the factory system to the at least one ECU or a sensor without passing the GW at the update mode.

In addition, the method may further include, after the step d), performing a disconnection operation to disconnect the smart control device from the vehicle when a next work mode does not exist.

According to an exemplary embodiment of the present disclosure, since the smart control device is temporarily mounted on the manufactured vehicle only in the vehicle factory to support the high-speed communication with various ECUs in the vehicle, the virtualization, the monitoring and the update mode can be performed without changing the vehicle system or adding a hardware.

In addition, it is possible to perform a work suitable for the communication protocols of the various ECUs through the smart control device, and the ECUs of various functions may be simultaneously inspected, controlled, monitored, and updated.

In addition, it is possible to reduce inspection manpower and cost by performing unmanned driving control of the manufactured vehicles by simulating the vehicle driving control messages used only in the vehicle factories, not on general roads.

DETAILED DESCRIPTION OF THE EMBODIMENTS

In the following detailed description, only certain exemplary embodiments of the present disclosure have been shown and described, simply by way of illustration.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle," "vehicular," "car," or other similar term as used herein is inclusive of motor vehicles, in general, such as passenger automobiles including sports utility vehicles (SUVs), buses, trucks, various commercial vehicles, watercraft including a variety of boats and ships, aircraft, and the like.

Throughout the specification, terms such as first, second, A, B, (a), (b), and likes may be used to describe elements of various configurations, but the constituent elements should not be limited by the terms. These terms are only for distinguishing the constituent element from other constituent elements, and a nature, an order, or a sequence of the corresponding constituent element is not limited by the term.

Throughout the specification, when a constituent element is referred to as being 'connected to' or 'accessed to' another constituent element, it should be understood that the constituent element is directly connected or accessed to another constituent element, or other constituent element exists between the constituent element and another constituent element connected to each other. On the other hand, when a constituent element is referred to as being 'directly connected to' or 'directly accessed to' another constituent element, it should be understood that there is no other constituent element between the constituent element and another constituent element connected to each other.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

A vehicle control method using a smart control device according to an exemplary embodiment of the present disclosure will hereinafter be described in detail with reference to the accompanying drawings.

Figure 1:
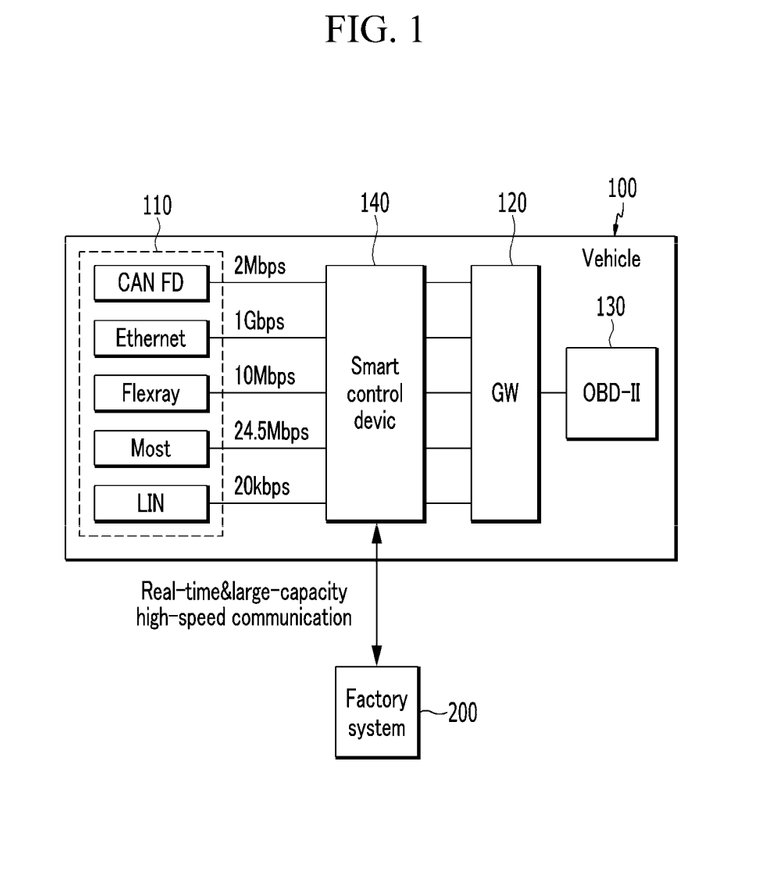
FIG. 1 is a block diagram illustrating a mounting structure of a smart control device on a vehicle according to an exemplary embodiment of the present disclosure.

FIG. 1 is a block diagram illustrating a mounting structure of a smart control device on a vehicle according to an exemplary embodiment of the present disclosure.

Referring to FIG. 1, a vehicle 100 includes an internal communication device 110, a gateway (GVV) 120, an OBD-II 130 and a smart control device 140.

The vehicle 100 includes a driving controller 111 and at least one ECU 112 (shown in FIG. 3, for example) for controlling a transmission unit, a braking unit, a steering unit, an acceleration unit, and so on. The driving controller 111 may include at least one sensor 113 (shown in FIG. 3, for example) for supporting functions of an ADAS (Advanced Driver Assistance Systems) or control driving of the vehicle, interworking with the ADAS.

The internal communication device 110 includes various communication protocols including at least one of CAN FD, CAN, Ethernet, Flexray, Most and LIN. The internal communication device 110 includes a plurality of communication lines for different communication protocols. Each communication line connects the corresponding ECU 112 and the corresponding sensor 113 for each function.

The GW 120 integrates and connects the various ECU 112 in the vehicle and the plurality of communication lines for different communication protocols.

In addition, the GW 120 connects communication between the various ECU 112 in the vehicle and an external factory system 200 through the OBD-II 130. The communication connected through the OBD-II 130 will hereinafter be called a diagnosis communication.

The OBD-II 130 connects the diagnosis communication with the factory system 200 to exchange information necessary for processes.

The factory system 200 is equipment for work in the processes, and includes at least one of an inspection device, a portable inspection device of a worker, and a manufacturing execution system (MES) that centrally monitors work state in the vehicle factory.

The factory system 200 is a computer system including a hardware and a software of information communication function. The factory system 200 can manage matching information and operation state of the smart control device 140 operated in the vehicle factory and the vehicle at which the smart control device 140 is mounted.

The operation of the smart control device 140 according to the exemplary embodiment of the present disclosure through the factory system 200 will hereinafter be described in further detail.

The factory system 200 used in a smart factory of the production process connects real-time and large-capacity communication with the vehicle to control various works such as a virtualization mode, an inspection mode, a monitoring mode, a calibration mode, and an update mode for each inspection process. Here, the virtualization mode means a mode in which the vehicle is remotely controlled by transmitting a simulated signal for executing a specific function to various ECUs 112 in the vehicle as mentioned above.

For example, the factory system 200 simulates a driving control signals for a starting unit, the steering unit, the transmission unit, the acceleration unit, and the braking unit of the vehicle through the virtualization mode to remotely control the driving of the vehicle (e.g., unmanned driving/autonomous driving). Through this, it is possible to move the vehicle for each process, or to perform inspections such as a road driving test in a predetermined section, or a simulation driving test using a driving roller without a worker. In addition, the factory system 200 can calibrate set values of the various ECUs 112 through the calibration mode when the calibration is necessary based on inspection/diagnosis results of the specified function.

In addition, the factory system 200 can operate the various ECUs 112 in the vehicle with a remote control and determine the operation state for each function at the monitoring mode.

In addition, the factory system 200 can transmit large-capacity data such as a firmware, a software, a program, and the like necessary for executing the functions of the various ECUs 112 in the vehicle through the update mode.

In this way, in order for the factory system 200 to implement the various modes used in the smart factory, the real-time and large-capacity communication with the various ECUs 112 in the vehicle must be guaranteed.

However, as described above, the diagnosis communication using the GW 120 and the OBD-II 130 is difficult to support the real-time and large-capacity communication due to a delay in the GW 120 and a deterioration of communication speed of the OBD-II 130.

Here, when performing the work such as the virtualization using an internal communication network in a conventional vehicle factory, an additional connector and an additional cable to be connected to a cable of the vehicle must be produced. This requires connection work with the vehicle for each communication protocol each time, causing additional works and cost. In addition, if such additional works are performed on a manufactured vehicle, there may be a risk of vehicle damage.

In order to solve these various problems, the smart control device 140 according to the exemplary embodiment of the present disclosure is provided.

The smart control device 140 according to the exemplary embodiment of the present disclosure is temporarily mounted on the vehicle 100 produced in the vehicle factory to connect smooth communication required for work modes in the factory system 200. The smart control device 140 can be configured in a form of a terminal that can be attached to or detached from the vehicle 100.

The smart control device 140 can be mounted between male and female communication connectors of the GW 120 after decoupling the male and female communication connectors to support the real-time and large-capacity communication required for a specific mode of the vehicle 100 in production. In addition, the smart control device 140 may be detached from the vehicle that has fully produced and then may be reused in another manufactured vehicle.

The smart control device 140 is mounted between the internal communication device 110 of the vehicle 100 and the GW 120 and directly connects the various ECUs 112 and the sensor 113 with the factory system 200. In other words, the smart control device 140 can connect the real-time and large-capacity high-speed communication between the various ECUs 112 and the external factory system 200 without passing the GW 120 and the OBD-II 130 at the various modes.

Through this, it is possible to support the work modes such as the virtualization mode, the monitoring mode, and the update mode in the vehicle factory without attaching an additional cable and an additional connector to the vehicle.

In addition, since only the smart control device 140 is removed from the manufactured vehicle and the male and female connectors of the GW 120 are reconnected, additional hardware, software and communication resources are not required.

Figure 2:
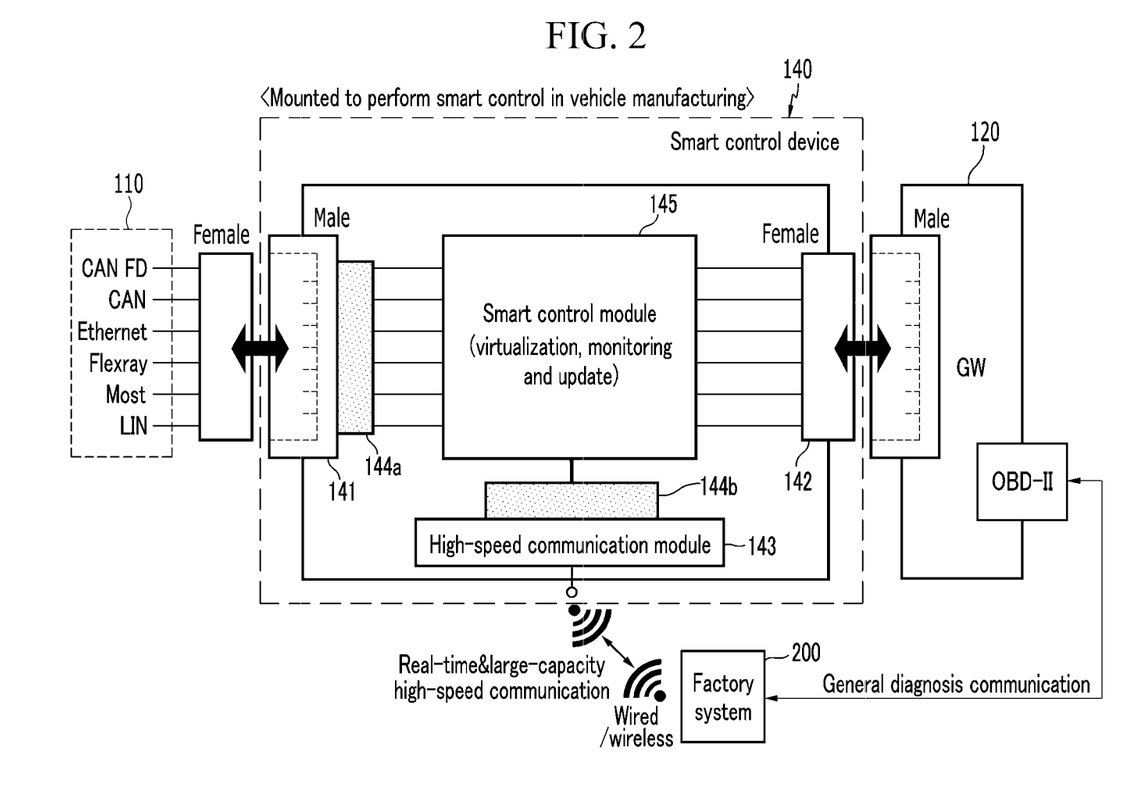
FIG. 2 is a block diagram briefly illustrating a smart control device according to an exemplary embodiment of the present disclosure.

FIG. 2 is a block diagram briefly illustrating a smart control device according to an exemplary embodiment of the present disclosure.

Referring to FIG. 2, the smart control device 140 according to the exemplary embodiment of the present disclosure includes a first connector 141, a second connector 142, a high-speed communication module 143, a signal filter module 144a/144b, and a smart control module 145.

The first connector 141 is coupled to a connector of the internal communication device 110 to be connected to the various ECUs 112.

The second connector 142 is coupled to a connector of the GW 120 to establish the communication between the ECUs 112 in the vehicle and the diagnosis communication through the OBD-II 130. The first connector 141 and the second connector 142 have male/female structures corresponding to female/male structures of the connectors of the internal communication device 110 and the GW 120. However, the male/female structures may be changed according to the vehicle design.

The high-speed communication module 143 is connected to the first connector 141 and the second connector 142 and establishes high-speed communication with the external factory system 200 through wired/wireless communication means. Here, the high-speed communication is faster than the diagnosis communication speed (500 kbps) using the conventional OBD-II, and faster than the fastest communication speed among the communication protocols of the ECUs 112 applied to the vehicles.

The high-speed communication module 143 can be connected to the factory system 200 by wire including a high-speed wired interface. In addition, the high-speed communication module 143 can be wirelessly connected to the factory system 200 through a wireless LAN (WIFI) or a 5G repeater through an antenna.

The signal filter module 144a/144b filters to hook only a signal designated as a specific mode information among various signals (e.g., A to Z) transmitted and received to the internal communication device 110. For example, the signal filter module 144 may filter an A signal according to the virtualization mode, a B signal according to the monitoring mode, or a C signal according to the update mode among the A to Z signals. Additionally, the signal filter module 144a/144b can further filter the signal specified according to the mode addition.

The signal filter module 144a/144b includes a first signal filter module 144a mounted near the first connector 141 and a second signal filter module 144b mounted near the high-speed communication module 143.

The second signal filter module 144b hooks a signal related to the virtualization mode among signals received from the factory system 200 and transmits the signal to the smart control module 145.

In addition, the first signal filter module 144a hooks a signal related to the virtualization mode among signal transmitted from the internal communication device 110 and transmits the signal to the smart control module 145.

The smart control module 145 may include a processor for controlling overall operation of smart control for vehicle communication according to an exemplary embodiment of the present disclosure, and a memory for storing at least one program for the processor to execute functions described with respect to the smart control module 145 and data for the processor.

The smart control module 145 selectively establishes the real-time/large-capacity high-speed communication through the high-speed communication module 143 or the general diagnosis communication through the GW 120 and the OBD-II 130 depending on whether the signal hooked from the signal filter module 144a/144b is received.

That is, when the smart control module 145 receives a mode designating signal which designates one work mode among the virtualization mode, the monitoring mode, and the update mode from the factory system 200, the smart control module 145 can be connected to the factory system 200 through the high-speed communication module 143 and start the designated work mode.

In addition, an exemplary embodiment of the present disclosure is not limited thereto, and the smart control module 145 can replace all communication performed by the diagnosis communication of the conventional GW 120 and the conventional OBD-II 130 with the high-speed communication of the high-speed communication module 143.

Hereinafter, a smart control method at the virtualization mode, the monitoring mode or the update mode of the smart control device 140 will be described respectively referring to FIGS. 3 to 5.

Figure 3:
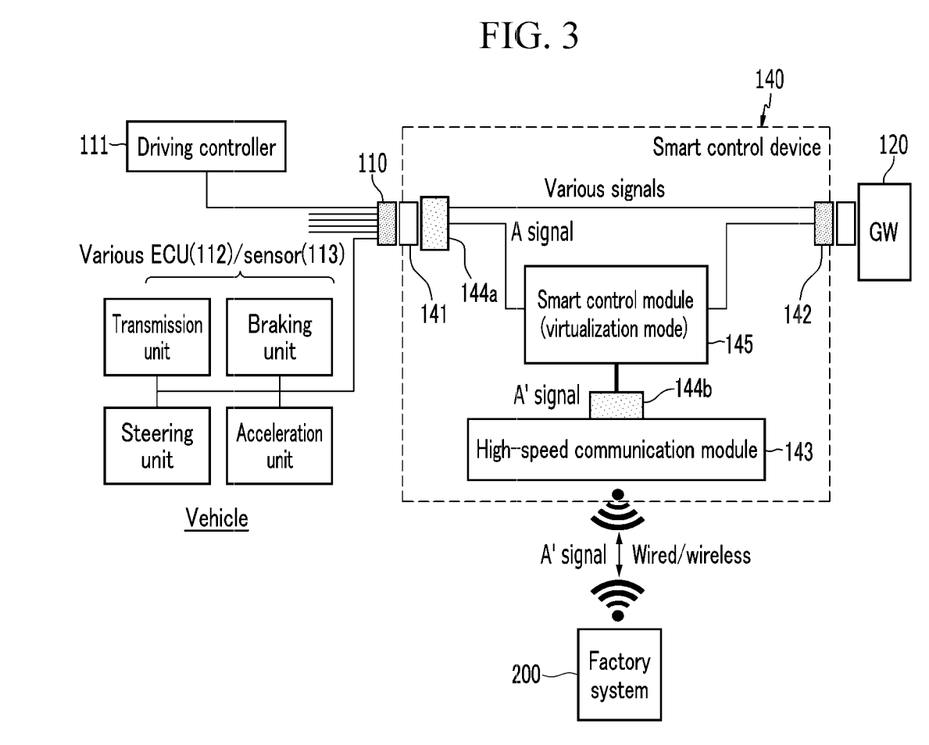
FIG. 3 illustrates a method of controlling a virtualization mode according to the first exemplary embodiment of the present disclosure.

FIG. 3 illustrates a method of controlling a virtualization mode according to the first exemplary embodiment of the present disclosure.

Referring to FIG. 3, the smart control module 145 is connected to the high-speed communication module 143 and performs works at the virtualization mode based on the signal from the factory system 200 designating the virtualization mode.

The smart control module 145 directly receives the vehicle driving control signal A' simulated at the factory system 200 through the high-speed communication module 143 without passing the GW 120 at the virtualization mode. The vehicle driving control signal A' is a signal filtered by the signal filter module 144b depending on the virtualization mode. The vehicle driving control signal A' is generated by simulating a vehicle driving control message used only in the vehicle factory, not on a general road, and includes control signals of the transmission unit, the acceleration unit, the deceleration unit, the braking unit and/or the steering unit of the vehicle.

The smart control module 145 converts the vehicle driving control signal A' into an ECU control signal A related to an actual vehicle driving control and transmits the ECU control signal A to the various ECUs 112 when receiving the vehicle driving control signal A' from the factory system 200.

Here, the smart control device 140 needs to convert the vehicle driving control signal A' into the ECU control signal A in consideration of vehicle control based on vehicle types/specifications because the smart control device 140 can be mounted on various vehicles produced in the vehicle factory. Therefore, the smart control module 145 can store various ECU control maps for the vehicle control based on the vehicle types/specifications in the memory in advance. In addition, the smart control module 145 can check the vehicle types/specifications included in the simulated vehicle driving control signal A' and convert the vehicle driving control signal A' into the ECU control signal A referring to the corresponding ECU control map.

However, the smart control module 145 converts the vehicle driving control signal A' only related to the vehicle driving control at the virtualization mode into the ECU control signal A, and transmits the remaining vehicle driving control signals A' without conversion.

The smart control module 145 transmits the converted ECU control signal A through the first connector 141 to the various ECUs controlling at least one of the transmission unit, the braking unit, the steering unit, and the acceleration unit to perform the vehicle driving control.

After that, the smart control module 145 transmits state information received from the various ECUs 112 and the sensor 113 according to the vehicle driving control to the factory system 200 through the high-speed communication module 143.

Figure 4:
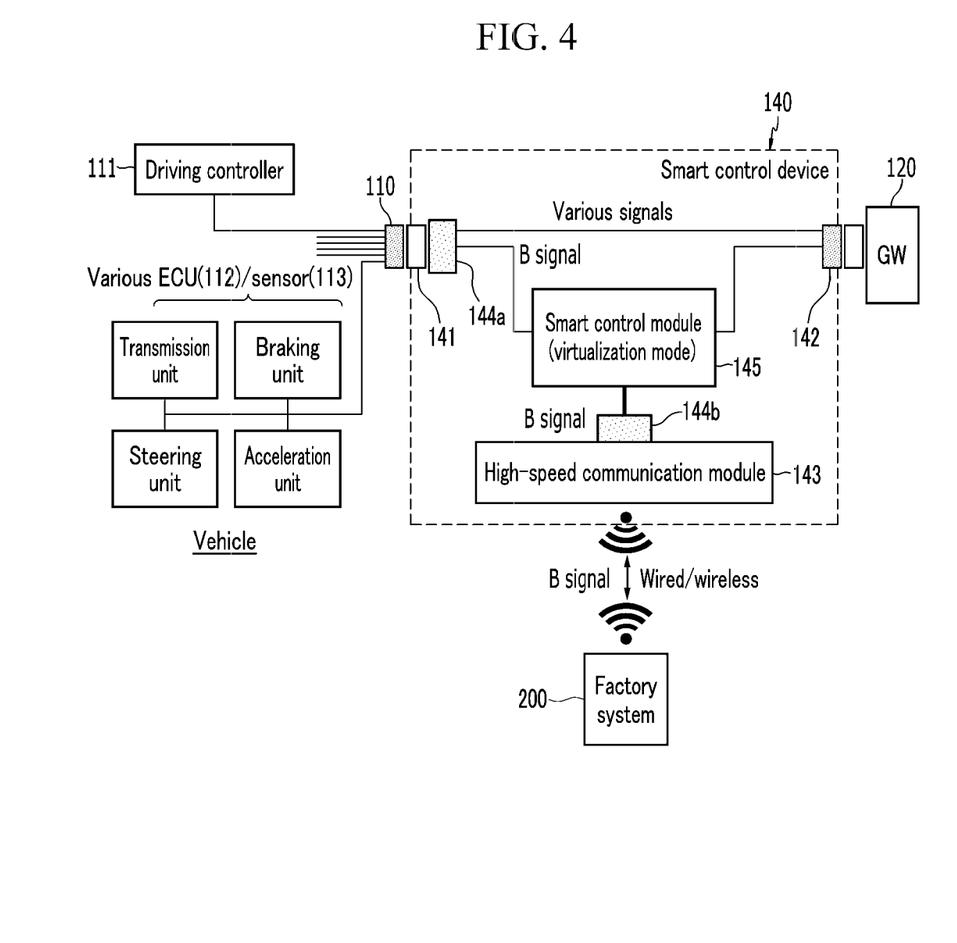
FIG. 4 illustrates a method of controlling a monitoring mode according to the second exemplary embodiment of the present disclosure.

FIG. 4 illustrates a method of controlling a monitoring mode according to the second exemplary embodiment of the present disclosure.

Referring to FIG. 4, the monitoring mode according to the second exemplary embodiment of the present disclosure is a work mode at which the factory system 200 monitors a state of the vehicle in real-time through the smart control device 140 mounted on the vehicle 100.

The smart control module 145 is connected to the high-speed communication module 143 and performs works at the monitoring mode based on the signal from the factory system 200 designating the monitoring mode.

The smart control module 145 transmits the monitoring signal B obtained by the various ECUs 112 and the sensor 113 to the factory system 200 without conversion and without passing the GW 120 and the OBD-II 130 at the monitoring mode.

That is, the smart control module 145 directly acquires the actual monitoring signal B from the various ECUs 112 or the sensor 113 without receiving delayed/modulated signals from the GW 120 and the OBD-II 130 as in the conventional art. In addition, the smart control module 145 transmits the monitoring signal B to the factory system 200 without conversion in real-time to monitor the state of the vehicle.

Figure 5:
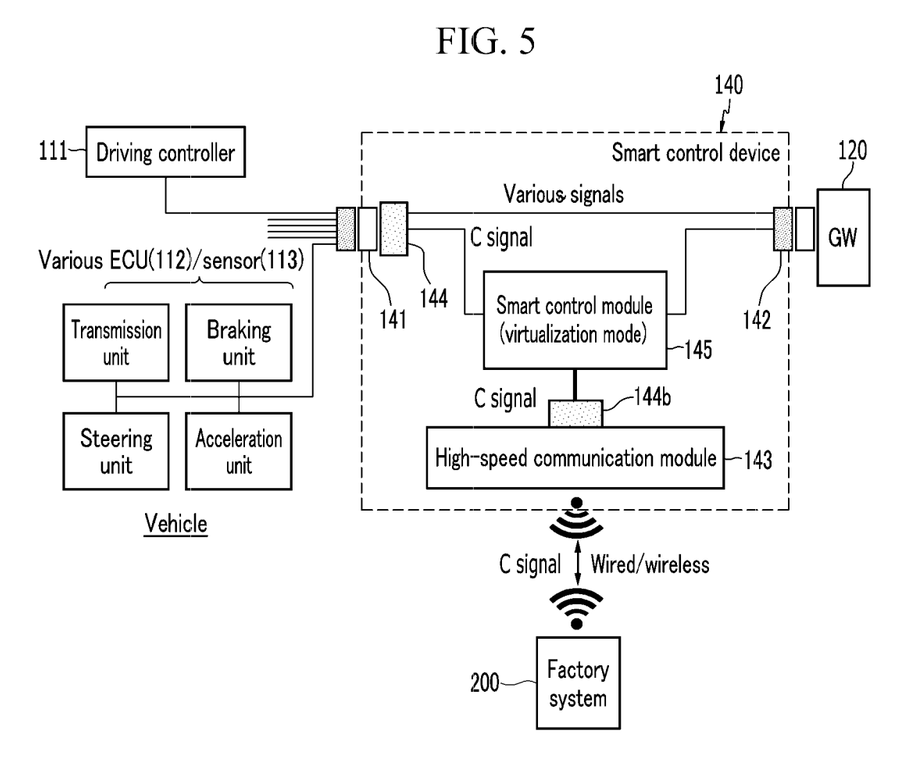
FIG. 5 illustrates a method of controlling an update mode according to the third exemplary embodiment of the present disclosure.

FIG. 5 illustrates a method of controlling an update mode according to the third exemplary embodiment of the present disclosure.

Referring to FIG. 5, the update mode according to the third exemplary embodiment of the present disclosure is a work mode at which the update data C received from the factory system 200 with the same speed as the communication speed of the various ECUs 112 through the smart control device 140 mounted on the vehicle 100 is transmitted to the various ECUs 112 or the sensor 113. For example, the update mode includes works to update the firmware of the various ECUs 112 and to correct the programs, the calibration values and other information.

The smart control device 140 is connected to the high-speed communication module 143 and performs works at the update mode based on the signal from the factory system 200 designating the update mode.

The smart control module 145 transmits update data C received from the factory system 200 to the various ECUs 112 or the sensor 113 without conversion and without passing the GW 120 and the OBD-II 130 when performing the works at the update mode. Therefore, it is possible to quickly update the firmware, the program, the calibration values and other information of the various ECUs 112 to the vehicle without reducing a transmission speed of large-capacity data.

The smart control module 145 may be implemented with at least one processor operating according to a predetermined program stored in, for example, a memory or storage of the smart control module 145. In addition, the predetermined program may be programmed to cause the at least one processor to perform each step of the vehicle communication control of the smart control device 140 according to an exemplary embodiment of the present disclosure.

A vehicle control method using the smart control device according to the exemplary embodiment of the present disclosure will be described in detail referring to FIG. 6. However, it is obvious to a person of an ordinary skill in the art in light of the technical spirit of the present disclosure that each configuration of the smart control device 140 described above can be implemented in various configurations by being further subdivided or integrated for each function. Therefore, when describing the vehicle control method using the smart control device according to the exemplary embodiment of the present disclosure referring to FIG. 6, the smart control device 140 will be the subject unless the context clearly indicates otherwise.

Figure 6:
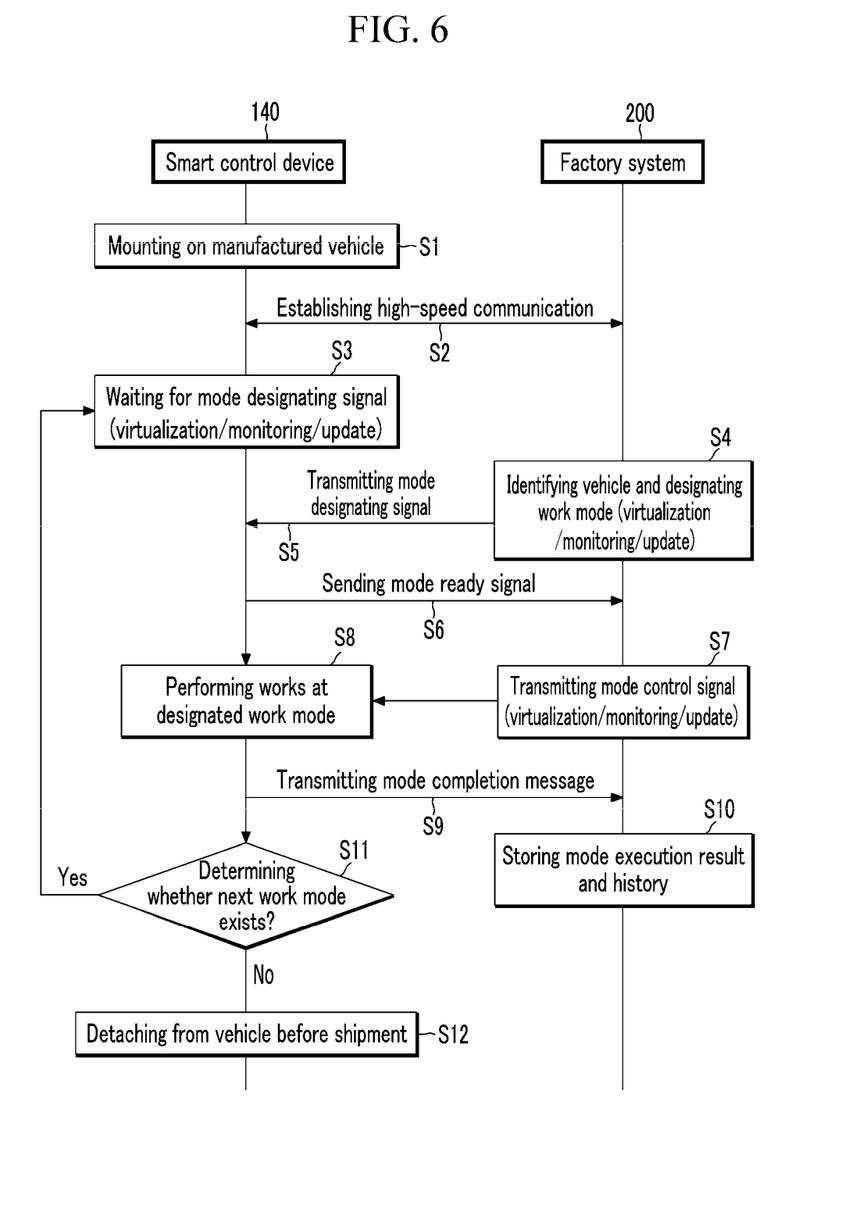
FIG. 6 is a flowchart of a vehicle control method using a smart control device for a vehicle factory according to an exemplary embodiment of the present disclosure.

FIG. 6 is a flowchart of a vehicle control method using a smart control device for a vehicle factory according to an exemplary embodiment of the present disclosure.

Referring to FIG. 6, the smart control device 140 according to the exemplary embodiment of the present disclosure is mounted between the internal communication device 110 of the vehicle manufactured in the vehicle factory and the GW 120 and is connected to the various ECUs 112 and the sensor 113 at step S1. The smart control device 140 may be mounted when mounting the GW 120 in the vehicle 100.

The smart control device 140 establishes the high-speed communication between the vehicle and the factory system 200 at step S2 when electric power is supplied. The smart control device 140 can be connected to the factory system 200 of the current process through the wired/wireless high-speed communication.

After establishing the high-speed communication, the smart control device 140 waits for the mode designating signal from the factory system 200 at step S3.

At this time, the factory system 200 recognizes entry of the corresponding vehicle by exchanging identification information ID when establishing the high-speed communication (e.g., through VIN) and designates the work mode that meets the vehicle types/specifications at step S4. For example, the factory system 200 transmits the mode designating signal designating any one of the virtualization mode, the monitoring mode, and the update mode to the smart control device 140 at step S5.

When the smart control device 140 receives the mode designating signal from the factory system 200, the smart control device 140 sets necessary information for the designated work mode and sends a mode ready signal to the factory system 200 at step S6.

At this time, as the factory system 200 receives the mode ready signal, a mode control signal for any one work mode among the virtualization mode, the monitoring mode, and the update mode is transmitted to the smart control device 140 at step S7.

When the smart control device 140 receives the mode control signal from the factory system 200, the smart control device 140 starts and performs works at the designated work mode among the virtualization mode, the monitoring mode, and the update mode at step S8.

Figure 7:
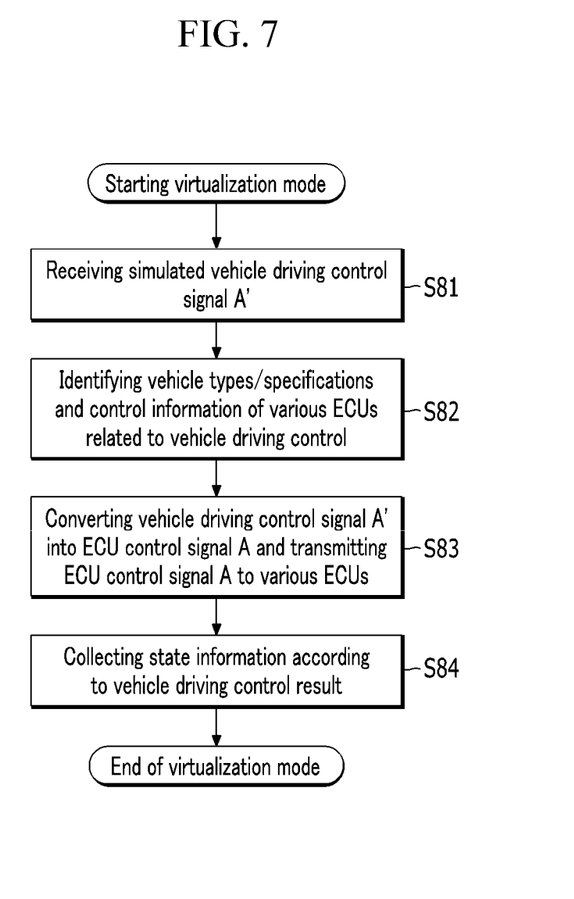
FIG. 7 is a flowchart of a method of controlling a virtualization mode according to an exemplary embodiment of the present disclosure.

For example, FIG. 7 is a flowchart of a method of controlling a virtualization mode according to an exemplary embodiment of the present disclosure.

Referring to FIG. 7, the smart control device 140 performs the vehicle driving control according to the virtualization mode and performs a scenario of inspecting the various ECUs 112 according to the state of the transmission unit, the braking unit, the steering unit, and the acceleration unit.

The smart control device 140 receives the simulated vehicle driving control signal A' from the factory system 200 upon start of the virtualization mode at step S81. The vehicle driving control signal A' is a signal hooked by the signal filter module 144 and is directly received through the high-speed communication module 143 without passing the GW 120.

The smart control device 140 analyzes the simulated vehicle driving control signal A' and identifies the vehicle types/specifications and control information of the various ECUs 112 related to the vehicle driving control at step S82. The smart control device 140 determines virtualized driving control information of at least one of the acceleration unit, the deceleration unit, the steering unit, the transmission unit, and the braking unit corresponding to the various ECUs 112.

The smart control device 140 converts the vehicle driving control signal A' into the ECU control signal A related to the corresponding vehicle driving control by referring to the ECU control map considering the vehicle types/specifications and transmits the ECU control signal A to the various ECUs 112 at step S83.

When the smart control device 140 completes the vehicle driving control, the smart control device 140 collects state information according to the vehicle driving control result from the various ECUs 112 and the sensor 113 at step S84.

The smart control device 140 can complete the virtualization mode through the above steps.

Then, when the smart control device 140 completes the designated work mode, the smart control device 140 transmits a mode completion message to the factory system 200 at step S9. The mode completion message may include at least one information among a normal execution result of the designated mode, a good/bad determination result according to a specific function check, a monitoring information, an update result, and an abnormal event occurrence.

Therefore, when the smart control device 140 receives the mode completion message, the smart control device 140 stores a mode execution result for each vehicle and a history in the database DB. In addition, problem situations such as failure and events can be handled.

The smart control device 140 returns to the step S3 and waits if there is a next work mode to be performed (yes' at step S11) after completing the previous work mode.

At this time, the smart control device 140 may further perform the monitoring mode or the update mode according to the mode designating signal from the factory system 200. Performing the next work mode may be referred to the above description through FIG. 4 and FIG. 5.

On the other hand, if the next work mode does not exist, the smart control device 140 is detached from the manufactured vehicle before shipment at step S12. At this time, the temporarily connected high-speed communication in the vehicle factory is released. In addition, the internal communication device 110 and the GW 120 of the vehicle are connected and normalized.

Thereafter, the smart control device 140 can be retrieved and used in other manufactured vehicles.

As described above, according to an exemplary embodiment of the present disclosure, the smart control device is temporarily mounted on the manufactured vehicle only in the vehicle factory to support the high-speed communication with the various ECUs in the vehicle, and is retrieved at the time of shipment. Therefore, the virtualization, the monitoring, and the update modes can be smoothly supported without changing a vehicle system or adding hardware.

Specifically, the smart control device, which is directly connected through the various communication protocols without passing the GW of the vehicle, is directly connected to the external factory system, so that various inspection modes for each process can be supported without performance deterioration of the hardware, the software, and the communication. In other words, the mode work requiring for the real-time/large-capacity data processing, which was not possible due to communication problems and all work performed using the GW and the OBD-II during manufacturing the vehicle in the vehicle factory, can be effectively performed without affecting the main function of the vehicle.

In addition, it is possible to perform work suitable for communication protocols of the various ECUs through the smart control device, and to simultaneously inspect, control, monitor, and update the ECUs of various functions.

In addition, it is possible to reduce manpower and cost of inspection work by performing unmanned driving control of the manufactured vehicles by simulating vehicle driving control messages used only in the vehicle factories, not on general roads.

An exemplary embodiment of the present disclosure is not implemented only through the apparatus and/or method described above, but also through a program for realizing a function corresponding to the configuration of an exemplary embodiment of the present disclosure, and a recording medium in which the program is recorded. Such an implementation can be easily implemented by a person of ordinary skill in the art to which the present disclosure belongs from the description of the exemplary embodiment described above.

Although an exemplary embodiment of the present disclosure has been described in detail above, the scope of the present disclosure is not limited thereto, and various modifications and improvements by a person of an ordinary skill in using the basic concept of the present disclosure defined in the following claims range also belong to the scope of the present disclosure.

What is claimed is:

1. A smart control device which is detachably mountable to a vehicle in a vehicle factory,
   wherein the vehicle includes: a plurality of electric control units (ECUs) for controlling different functions of the vehicle; a plurality of sensors for supporting functions of the plurality of ECUs; an internal communication device includes a plurality of communication protocols and a plurality of communication lines for the plurality of communication protocols, each communication line connecting a corresponding ECU among the plurality of ECUs for each function to a corresponding sensor among the plurality of sensors; and a gateway (GW) connectable to the plurality of sensors through corresponding communication lines,
   wherein the internal communication device includes a connector and the GW includes a connector, such that the GW is integrally connected to the plurality of communication line of the internal communication device through a physical connection of the connector of the GW and the connector of the internal communication device, and
   wherein the smart control device comprises:
      a first connector physically and detachably coupled to the connector of the internal communication device to be connected with the plurality of ECUs;
      a second connector physically and detachably coupled to the connector of the GW to establish communication between the plurality of ECUs and the GW;
      a high-speed communication module configured to be connected to the first connector and the second connector and to establish external communication with a factory system; and
      a smart control module connected to the factory system through the high-speed communication module when receiving a mode designating signal which designates one work mode among a virtualization mode, a monitoring mode, and an update mode from the factory system, and controlling the designated work mode based on the mode designating signal from the factory system.

2. The smart control device of claim 1, wherein the second connector is further configured to establish diagnosis communication with the factory system through the GW and an On-Board Diagnostic version II (OBD-II), and
   wherein the smart control module is configured to selectively establish the external communication through the high-speed communication module or the diagnosis communication depending on whether the mode designating signal is received.

3. The smart control device of claim 1, further comprising a signal filter module configured to hook a signal related to the virtualization mode among at least one signal transmitted or received through the internal communication device and to transmit the signal to the smart control module.

4. The smart control device of claim 3, wherein the signal filter module comprises a first signal filter module mounted on a side of the first connector and a second signal filter module mounted on a side of the high-speed communication module.

5. The smart control device of claim 4, wherein the first signal filter module is configured to hook the signal related to the virtualization mode among the at least one signal transmitted or received through the internal communication device and to transmit the signal to the smart control module.

6. The smart control device of claim 4, wherein the second signal filter module is configured to hook a signal related to the virtualization mode among signals received from the factory system and to transmit the signal to the smart control module.

7. The smart control device of claim 1, wherein the high-speed communication module is configured to be connected to the factory system through a wired interface or wirelessly connected to the factory system through a repeater.

8. The smart control device of claim 1, wherein the smart control module is configured to directly receive a vehicle driving control signal simulated at the factory system through the high-speed communication module without passing the GW at the virtualization mode.

9. The smart control device of claim 8, wherein the vehicle driving control signal is generated by simulating a vehicle driving control message used in the vehicle factory and includes at least one control signal for controlling at least one of a transmission unit, an acceleration unit, a deceleration unit, a braking unit, and a steering unit of the vehicle.

10. The smart control device of claim 8, wherein the smart control module is configured to convert the vehicle driving control signal into an ECU control signal related to a vehicle driving control based on types and specifications of the vehicle and to transmit the ECU control signal to at least one ECU among the plurality of ECUs.

11. The smart control device of claim 10, wherein the smart control module is configured to store an ECU control map for each of types and specifications of the vehicle and to convert the vehicle driving control signal into the ECU control signal based on the ECU control map corresponding to the vehicle driving control signal.

12. The smart control device of claim 10, wherein the smart control module is configured to transmit state information received from at least one ECU among the plurality of ECUs the ECU and a sensor involved in the vehicle driving control to the factory system through the high-speed communication module.

13. The smart control device of claim 1, wherein the smart control module is configured to directly receive a monitoring signal from at least one ECU among the plurality of ECUs and a sensor and to transmit the non-converted monitoring signal to the factory system through the high-speed communication module at the monitoring mode.

14. The smart control device of claim 1, wherein the smart control module is configured to transmit a non-converted update data of at least one ECU among the plurality of ECUs or a sensor to the corresponding ECU or the corresponding sensor without passing the GW at the update mode.

15. A method of controlling a vehicle by the smart control device of claim 1 interworked with the factory system, the method comprising:
  step a1) of connecting the smart control device to the plurality of ECUs of the internal communication device of the vehicle through a physical connection of the connector of the internal communication device and the first connector;
  step a2) of establishing connection between the plurality of ECUs and the GW through a physical connection of the connector of the gateway and the second connector;
  step b) of establishing, by the smart control device, external communication with the factory system through the high-speed communication module and waiting for receiving the mode designating signal;
  step c) of setting, when receiving the mode designating signal, information required for the corresponding work mode by the smart control device; and
  step d) of receiving, by the smart control device, a mode control signal through the high-speed communication module and controlling one ECU among the plurality of ECUs to perform the designated work mode.

16. The method of claim 15, wherein the step d) comprises:
  receiving a vehicle driving control signal simulated at the factory system at the virtualization mode;
  identifying types and specifications of the vehicle by analyzing the simulated vehicle driving control signal; and
  converting the vehicle driving control signal into an ECU control signal related to a vehicle driving control based on an ECU control map corresponding to the types and the specifications of the vehicle and transmitting the ECU control signal to the one ECU among the plurality of ECUs.

17. The method of claim 16, further comprising, after transmitting the ECU control signal to the one ECU among the plurality of ECUs, collecting state information according to a result of the vehicle driving control from the one ECU among the plurality of ECUs or one sensor among the plurality of sensors and transmitting the state information to the factory system through the high-speed communication module.

18. The method of claim 15, wherein the step d) comprises transmitting a non-converted monitoring signal detected by the one ECU among the plurality of ECUs or one sensor among the plurality of sensors to the factory system without passing the GW at the monitoring mode.

19. The method of claim 15, wherein the step d) comprises transmitting a non-converted update data receiving from the factory system to the one ECU among the plurality of ECUs or one sensor among the plurality of sensors without passing the GW at the update mode.

20. The method of claim 16, further comprising, after the step d), performing a disconnection operation to disconnect the smart control device from the vehicle when a next work mode does not exist.

* * * * *